(12) United States Patent
Becker

(10) Patent No.: US 7,683,249 B2
(45) Date of Patent: Mar. 23, 2010

(54) DEVICE AND METHOD FOR CONTROLLING PLAYBACK DEVICES FOR DIGITAL INFORMATION, ESPECIALLY MUSIC INFORMATION

(75) Inventor: Friedemann Becker, Osterholz-Schambeck (DE)

(73) Assignee: Native Instruments Software Synthesis GmbH, Berlin (DE)

( * ) Notice: Subject to any disclaimer, the term of this patent is extended or adjusted under 35 U.S.C. 154(b) by 193 days.

(21) Appl. No.: 11/750,329

(22) Filed: May 17, 2007

(65) Prior Publication Data

US 2008/0223197 A1 Sep. 18, 2008

Related U.S. Application Data

(63) Continuation of application No. 10/503,652, filed as application No. PCT/EP03/01181 on Feb. 6, 2003, now Pat. No. 7,235,732.

(30) Foreign Application Priority Data

Feb. 15, 2002 (DE) .............................. 102 06 644

(51) Int. Cl.
*G10H 7/00* (2006.01)
*G11C 1/00* (2006.01)

(52) U.S. Cl. ........................................ 84/602; 84/645

(58) Field of Classification Search ........... 84/600–602, 84/645
See application file for complete search history.

(56) References Cited

U.S. PATENT DOCUMENTS

| | | | | |
|---|---|---|---|---|
| 5,734,731 | A * | 3/1998 | Marx | 381/119 |
| 6,379,244 | B1 * | 4/2002 | Sagawa et al. | 463/7 |
| 6,545,953 | B1 * | 4/2003 | Herbert | 369/4 |
| 6,818,815 | B2 * | 11/2004 | Cohen | 84/645 |
| 7,012,184 | B2 * | 3/2006 | Bastian | 84/612 |
| 2003/0029305 | A1 * | 2/2003 | Kent et al. | 84/645 |

* cited by examiner

*Primary Examiner*—Jeffrey Donels
(74) *Attorney, Agent, or Firm*—Nixon Peabody, LLP; Jeffrey L. Costellia

(57) ABSTRACT

The invention relates to a playback control unit which is connected with a playback device for CDs or records, wherein these provide coded information by means of which the playback device can be controlled. In this way, in addition to the playback speed, further functions can be controlled, namely selecting elements from a list, in particular a music archive, or determining skip marks or controlling software modules or the length of audio loops or a continuous modification of parameters, in particular audio effect parameters, for volume, filter, flange, echo, delay or a playback control of video sequences or parameters of video sequences, in particular color, resolution or parameters and positioning of objects in computer games.

31 Claims, 4 Drawing Sheets

DEVICE AND METHOD FOR CONTROLLING PLAYBACK DEVICES FOR DIGITAL INFORMATION, ESPECIALLY MUSIC INFORMATION

PRIORITY CLAIM TO PRIOR APPLICATIONS

This application is a continuation of and incorporates by reference U.S. patent application Ser. No. 10/503,652 filed Aug. 4, 2004, now U.S. Pat. No 7,235,732 which is a national stage entry of PCT/EP03/01181 filed Feb. 6, 2003, which is also incorporated by reference, which claims priority to DE 102 06 644.2 filed Feb. 15, 2002, which is also incorporated by reference.

TECHNICAL FIELD

The invention relates to a (controlled) playback device, in particular a PC, for playing back digitally stored information, in particular music information, which is controlled by conventional playback devices such as record players or CD players. Further aspects of the invention are information carriers such as CDs or vinyl records which are segmented accordingly. The analog or digital output signal of the conventional playback device is hereby evaluated by the digital playback device and converted into control information.

BACKGROUND

The publication WO 01/65559 discloses a control for reproducing digital audio data with aid of a vinyl record which is played on a conventional record player. This publication also describes a method which enables Disk Jockeys (DJs) to reproduce their music digitally stored on computers with the aid of special vinyl records (commercial name: FinalScratch). The advantage of this method is that DJs can work with the customary, robust record players in often quite cramped and poorly lit work surroundings without having to thereby control the playback of the digital piece of music via obscured computer keyboards, but be able to control them by their familiar actions on the record player.

The publication US 2001/0011497 discloses a device which controls the music playback in dependency on the rotation of a knob.

As can be seen in the application, it is only possible to control the speed and the play position of the digital playback by the vinyl record.

The disadvantage of the above described method is that it does not offer a solution to control also the selection of a musical piece from the archive stored on the hard disk or other parameters of the playback device affecting the sound. As before, the keyboard of the computer or another input device (e.g. the mouse) must be used for this purpose.

SUMMARY

In order to overcome this limitation the present invention provides a method and a device which can be individually used and make available to the DJ various operating functions that go beyond mere playback.

In principle, the analog or digital information carrier is segmented in the described method by dividing said information carrier into various areas which can be easily accessed by basic functions of the playback device used. By selecting an area, the user determines which parameters of the attached digital playback device (computer/software) he would like to control.

He controls the selected parameter by positioning the play position within the selected area. Thus, the surface of the information carrier represents a control surface.

Basically, digital information carriers and analog information carriers are to be considered.

In one embodiment of the described method, ring-shaped areas are preferably optically marked on the surface on a vinyl record. The DJ selects the parameters of the digital playback device to be controlled with the method by placing the audio receiver in one of the areas by hand. To control the selected parameter, the vinyl record is preferably moved forward and back by hand.

In a further embodiment, the ring-shaped areas are, on their part, optically divided into radial sectors. Hereby, the selected parameter of the digital playback device is not modified continuously, but only when crossing one of the optically visible radial markings.

In a further embodiment, a digital information carrier, for example an audio CD, is formatted such that the areas allocated to the parameters to be controlled are marked by track skip marks.

The playback area and the parameter to be controlled with it are hereby selected by the conventional track selection keys of the playback device.

The method described here offers a solution to the problem by using the signal generated by the data carrier and the associated playback device to drive a plurality of parameters and functions of the preferably digital playback device.

If one combines this method in the case of the vinyl disk with the playback method described in the publication WO 01/65559, the advantage is that a DJ can perform the entire operation of mixing digital pieces of music with the record player. To select a new music title, he only has to place the audio receiver in the corresponding control area of the record, preferably manually turn the record back and forth within this area until the desired title is indicated and loaded and to then replace the audio receiver back into the playback part of the record to play the title. The precise manual placing of the audio receiver in specific areas of the record as well as manually turning them back and forth is part of the DJ's basic trade and thus represents an ideal input method for him.

Only one method is known from the prior art which enables Disk Jockeys to play back their music digitally stored on computers with the aid of special vinyl disks. On the other hand, the use of digital media was not disclosed. In recent years, DJing by means of CD players has also established itself parallel to the art of vinyl placement. There are well engineered devices which enable infinitely variable control of the speed, starting of marked points, the playback of audio loops as well as the so-called scratching (manually moving the playback position forward and back).

The current DJ CD-players thus represent complex playback control units to indirectly control the playback of digital audio data. The described method can thus be transferred from the vinyl disk to the digital disk.

Therefore, in the digital domain, a further aspect of the invention is a digital storage medium for audio or video data, in particular a CD, DVD, mini disc, which has a coding that contains the information about playback position and speed for an external digital playback device (computer) to reproduce digital audio data files preferably stored on a hard disk when played on a playback device based on the reproduced information at the analog or digital output of the playback device.

In the digital domain, a further aspect of the invention is a digital storage medium for audio or video data, in particular a CD, DVD, minidisk which has a coding that enables one to determine the functions selected by the user, in particular the keys operated on the playback device when played on a playback device based on the reproduced information at the analog or digital output of the playback device.

The method described here allocates the operating sequences on the playback device to the functions of the digital playback device. Preferably, this enables a selection of elements from a list, in particular a music archive, or a determination of skip marks or the control of software modules or the length of audio loops or a continuous modification of parameters, in particular audio effect parameters for volume, filter, flange, echo, delay or a playback control of video sequences or parameters of video sequences, in particular color, resolution or parameters and positioning of objects in computer games.

As a result, in particular, large archives of music information on the hard disk (or other storage media) of the digital playback device (computer) can be started and preferably searched by means of conventional operating processes on the CD player.

Due to the high storage capacities of today's hard disks and the compression process for audio data files (MP3) as well as the extensive archiving functions which are available on computers, this method represents an advantage in comparison to conventional use of the CD player. Thus, the limitation to music titles of the inserted audio CD becomes unnecessary.

Music titles no longer have to be burned on a plurality of CDs, but can be easily called up directly from the hard disk and played back with all parameters which are available on the CD player.

In a further embodiment, to control the functions, forward and back movements within the selected track of the digital information carrier are used, corresponding to the forward and back movement of vinyl records. This is made possible by a "search mode" available on many professional CD players which stops the usual playback of the audio CD and continuously plays back the current playback position as an always recurring audio loop. One can slowly go through the track in this search mode by means of the forward and back keys or the conventional dial (Jogg-Wheel) on many CD players. The connected digital playback device evaluates the position just played back as a loop and activates the parameter associated with the track accordingly.

A further advantage of the method is that it is independent of the CD player used. Since a specific coding (time code, skip marks/tracks) are stored as information on the special CD, every CD player can be used for the method and exactly the same functions are available which this CD player also offers for conventional audio CDs.

A fundamental aspect of the present invention is a (controlled) playback device for playing back digitally stored information, in particular music information. Preferably, this is a conventional PC which has a sound card. This computer has access to digitally stored (playback) information, in particular music information, either directly or via a network. The sound card usually serves as interface means in the input path which enable a connection to a controllable audio or video data playback device, in particular, a record player, CD player, DVD player or minidisk player. A program is running on the computer which manages a storage area in which patterns are stored which can be individually associated with function call-ups of the (controlled) playback device. Due to the individual connections, it is possible for the user to independently establish the function profile. This applies to both digital and analog information carriers.

Furthermore, the computer comprises means for comparing the patterns with information from the controllable audio or video data playback devices, wherein the associated function is performed when a pattern is identified.

In digital media, an essential point of the invention is also a control beyond the playback speed. The types of controls are described above. It is pointed out that analog media can also be used for the control.

Furthermore, in the digital domain, a digital storage medium is also part of the invention for audio or video data, in particular a CD, DVD, minidisk which has a special coding that enables the functions selected by the user to be determined, in particular the depressed keys, when played on a playback device based on the reproduced information at the analog or digital output of the playback device. To obtain this, differently coded tracks are used for the identification.

In records, in particular vinyl records, optically emphasized segments are preferably provided by control information. These segments can be both rings and radial segments. Detailed examples are found below. The individual segments are identified by the playback device on the basis of their codings. The coding takes place by known modulation processes which transfer the coding in the form of an audio signal to the record. These codings can e.g. be time information. Alternatives with different frequency ranges are, however, also feasible. As a result, it is possible to determine segments based on information which are readable by an audio receiver and which enable a clear determination of a segment from which the audio receiver reads the information.

To control the audio receiver, segments of the disk are emphasized in color, so that they can be easily recognized, especially when it is dark. The color emphasis has, in particular, a special effect if it is fluorescent.

A further aspect of the present invention is a method for controlling a (controlled) playback device, in particular a PC, wherein the (controlled) playback device comprises interface means which enable a connection to a controllable audio and/or video data playback device, in particular record players, CD players, DVD players and/or minidisk players. In a first initialization step, information patterns, which are associated with functions of the (controlled) playback device, are stored in a storage area. On the basis of these reference patterns, it is possible to identify the information sent from the source.

In a further monitoring step, information is continuously read by the audio or video data playback devices in order to compare them with the patterns which are stored in the storage area. When a pattern is identified, the associated function is performed.

In a preferred embodiment, the functions can be individually allocated to the patterns. Thus, a DJ has all possibilities to control the computer by controlling the vinyl records or CDs.

The functions have already been described in detail above. In particular, these are functions which, aside from the playback speed, control the inventive device.

A further aspect of the invention is software which realizes the described method on a PC.

BRIEF DESCRIPTION OF THE FIGURES

The invention shall be described in greater detail in the following with reference to embodiments which are schematically illustrated in the figures. The same reference numbers in the individual figures refer to the same elements. The individual figures show.

DETAILED DESCRIPTION

Figure 3:
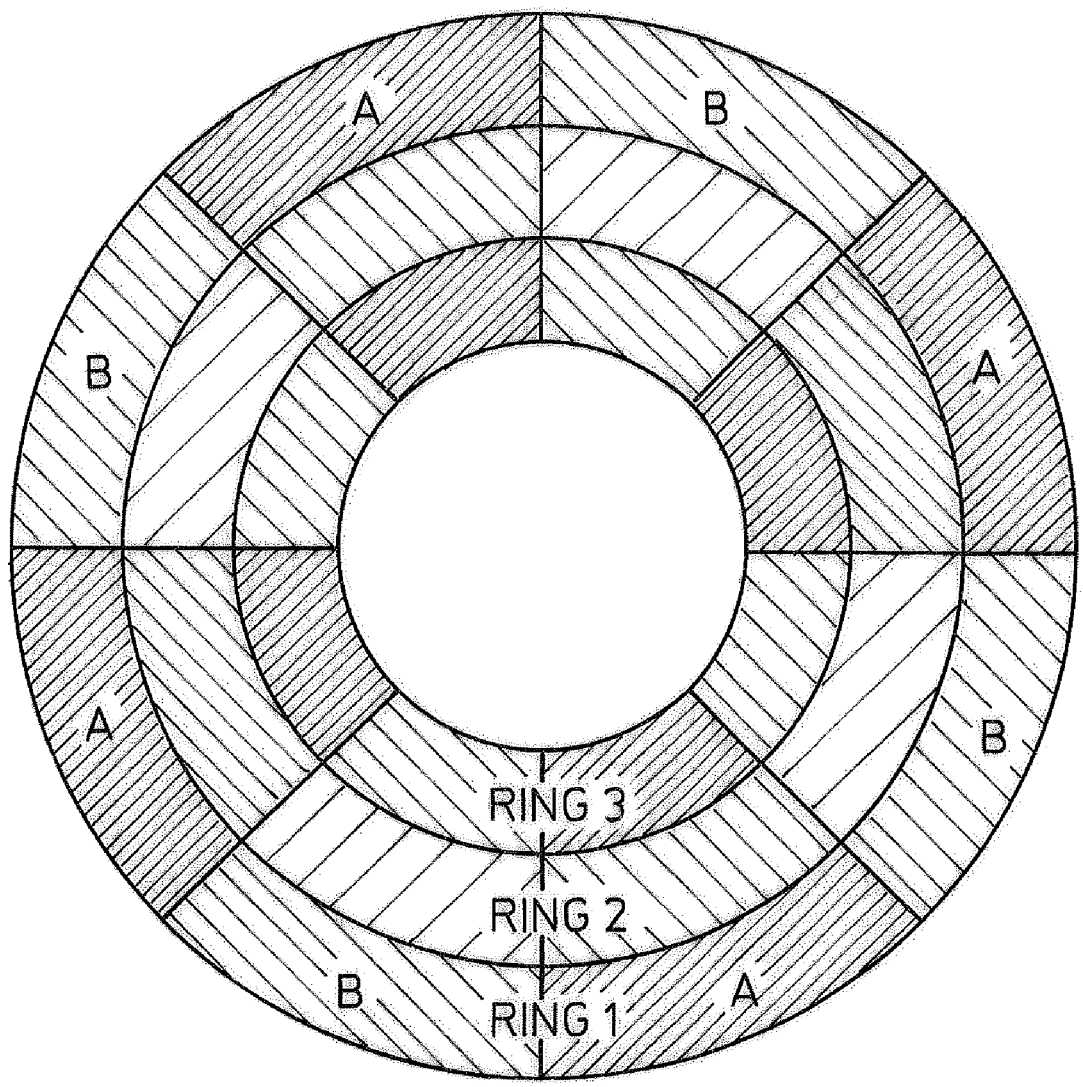
FIG. 3 the structure of a vinyl record with different sectors and rings, which are illustrated in an optically different manner, wherein the audio receiver can be manually placed in another area in order to then manually move the record forward and back to control the parameters of the digital playback device.

FIG. 3 shows the possible structure of a vinyl record. Thus, for example, RING 2 can control the selection of the music title from a list. The attached device identifies the selected ring on the basis of the first data transmitted. If the user now moves the record manually forward or back, the attached device interprets the resultant data flow and changes the parameters accordingly. The following possibilities for the control are described by way of example. Such one differentiates between an absolute and a relative control.

An absolute control will be considered in the following. The areas A/B are marked in color on the disk and correspond to various states of the selected parameter. Preferably, 8-32 such areas can be defined on a ring. The parameter of the device is set to the desired value by turning the record in such a way that the audio receiver is in the corresponding area.

In a relative control, the parameter is raised or lowered to the next permissible value in each case, when the audio receiver crosses a boundary between an A and a B area. This functions both forward and backward. The direction can be determined by corresponding time codings. This facilitates the assessment of the direction of rotation enormously. However, the crossing of boundaries can also be used for determining the direction. In this mode, the record functions as usual as an input dial (Jogg Wheel).

In a further mode, other codings can be undertaken. Complex movement patterns, which are performed with the record, can be evaluated by an attached device and allocated to a parameter or a value of the parameter. Examples of this are:
forward and back within one second
forward and stop within one second
back and stop within one second The combination possibilities are unlimited in this case. The aforementioned functions can be implemented at any time through the variable allocation.

The procedure in digital disks depends on the design of the CD playback device. In simple devices, the control can be accomplished merely by the keys of the playback system.

Figure 2:
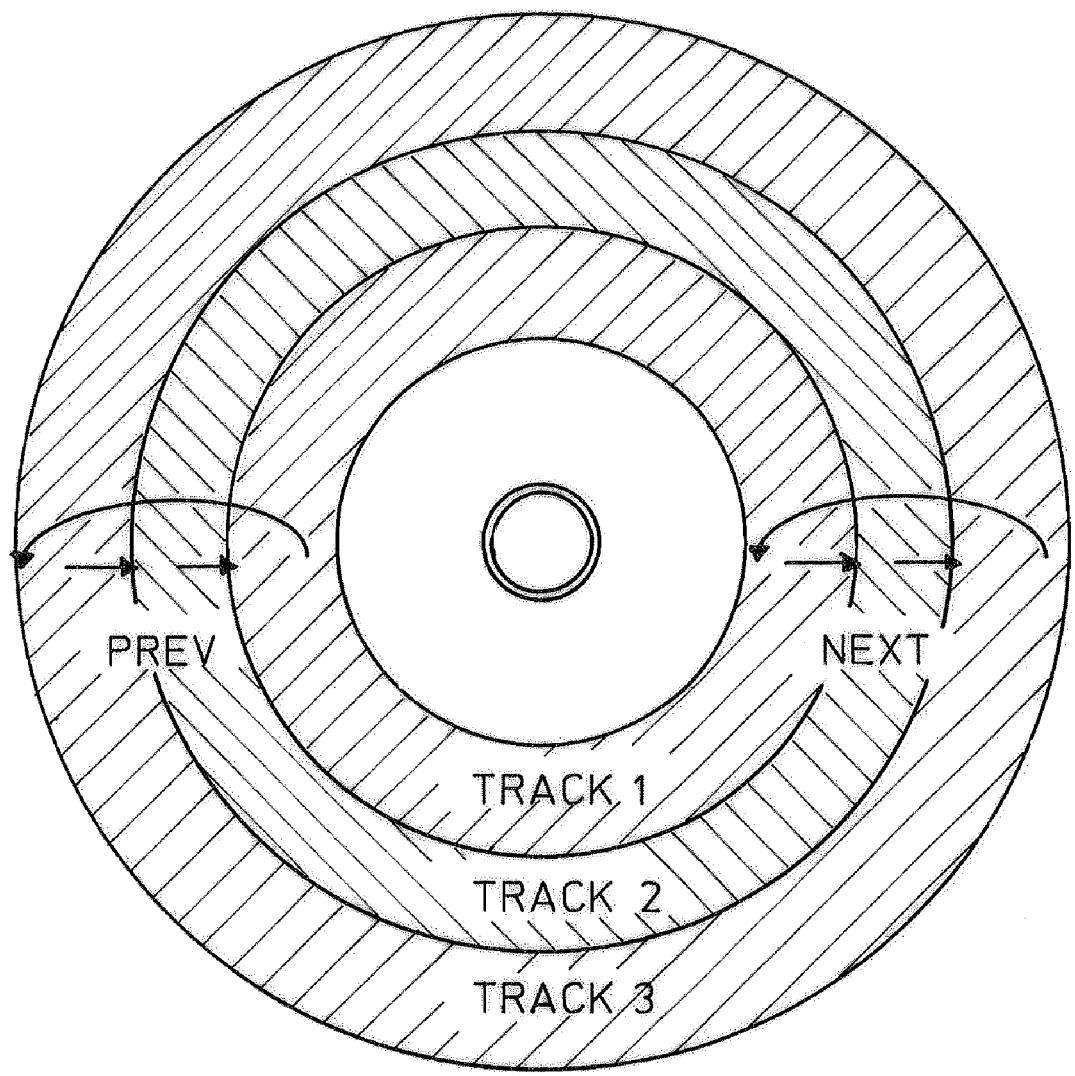
FIG. 2 the structure of a digital storage medium with three tracks, which each have different distinguishing time information, in order to start a selection function of the connected playback device by skipping from one track to the other.

In a first embodiment, which is described in FIG. 2, at least three tracks are required. To use the keys present on each conventional CD player for selecting the next/last track, 3 tracks are burned on the special CD which differ from one another in the code used. The attached playback device can then correctly evaluate the function of the continuation to the next/last title and load the next or last music title from the digital music archive into the playback unit.

In this case, when operating the "NEXT track" key on the CD player, the (controlled) playback device registers a skip of the received code in the sequence: TRACK 1.fwdarw.TRACK 2.fwdarw.TRACK 3.fwdarw.TRACK 1.fwdarw.., which can be clearly evaluated on the basis of the coding in order to load the next track from the digital music archives. In an advantageous embodiment, the track which is selected by operating the NEXT key is in a position to control the playback of the title. This control is obtained in that time information or counting information is stored. An upward counting is feasible. There is no difference in the operation of the CD player for the user, with the exception that the indicated TRACK number can only assume the values 1, 2 or 3 in the above example, whereas, in the digital music archive, any number of titles desired can be stored. However, each of the tracks is also simultaneously a playback control track in this case.

To operate the PREV key (last track), the invention works in reverse and the playback unit is prompted to load the respective previous track from the archives.

More complex CD playback devices are nowadays furnished with a search function (previously described) and input dials which enable a manual operation of the playback which comes very close to that of record players.

Figure 1:
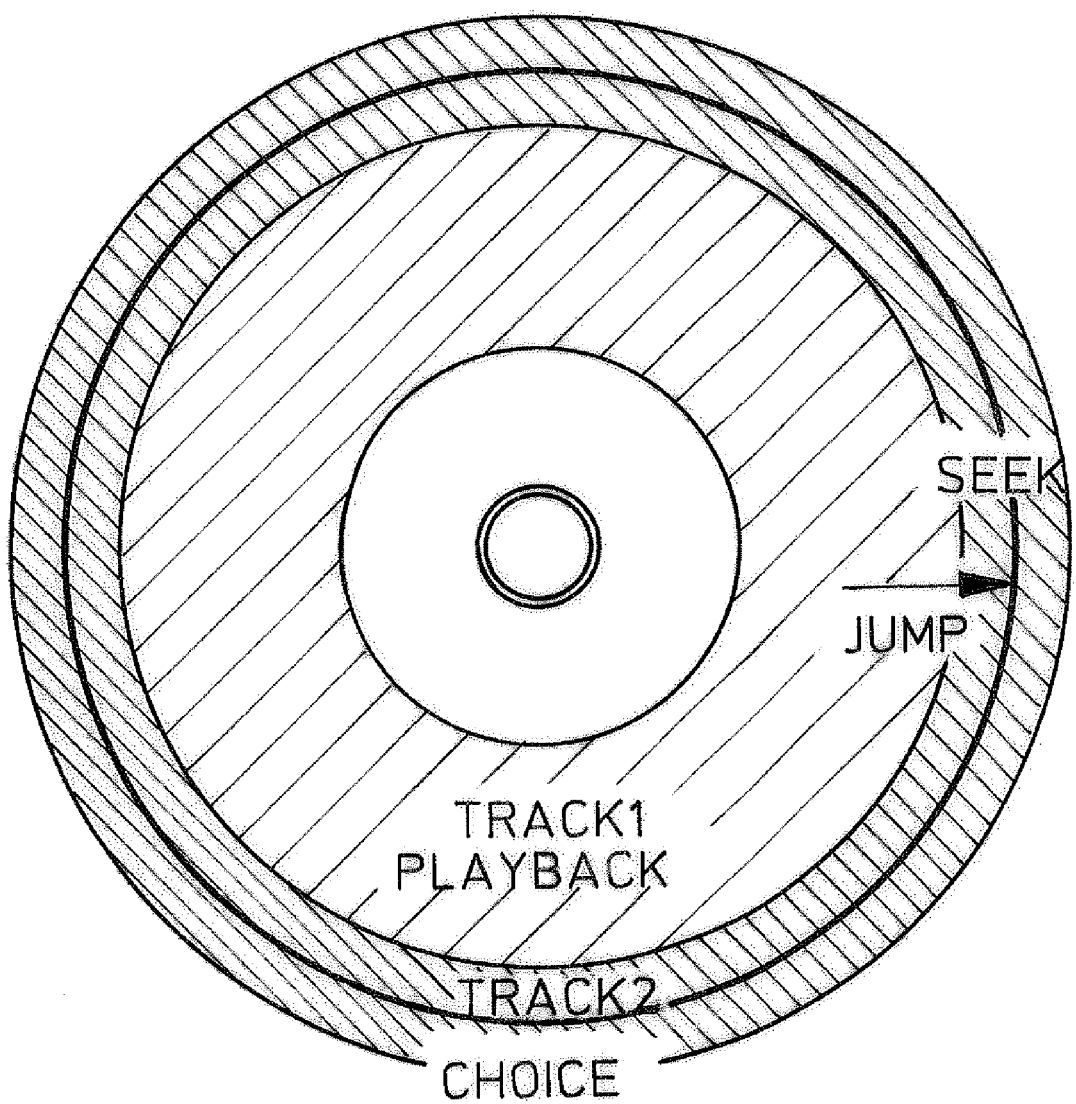
FIG. 1 the structure of a digital storage medium with two tracks, wherein the first track is provided with time information to control the playback speed and position, and the second track can be activated by a skip mark and is used for controlling a parameter.

A further embodiment is described in FIG. 1 which is suitable for such professional CD players.

The search function prompts the CD player to repeatedly reproduce the current playback position in an extremely short audio loop of a few tenths of a second. Usually, this function is used to accurately locate points on the audio CD by means of the forward and backward keys or the input dial and to place a mark there.

If, in addition to the playback control track, a second track is now burned on the CD, which comprises a control code which can be identified by the playback device, a movement of the playback position within this track can be interpreted by the playback device as a change in parameter, for example, as a selection of the next or last title from the archives. The skip mark on the CD which marks TRACK 2 here lies in the centre of the code area allocated to the title selection, so that both forward and back searches are possible.

If the desired title is found, one again skips to the playback control track and the playback of the selected title can be started.

The aforementioned functions should only be understood to be by way of example. Rather, with this control, music archives (play lists), skip marks (cue points), modules (in modular software/hardware), lengths of audio loops, continuous modification of parameters, audio effect parameters (e.g. volume, filter, flange, echo, delay, etc.), playback control of video sequences, parameters of video sequences (e.g. color, resolution, etc.), parameters and positioning of objects in computer games can be controlled.

Figure 4:
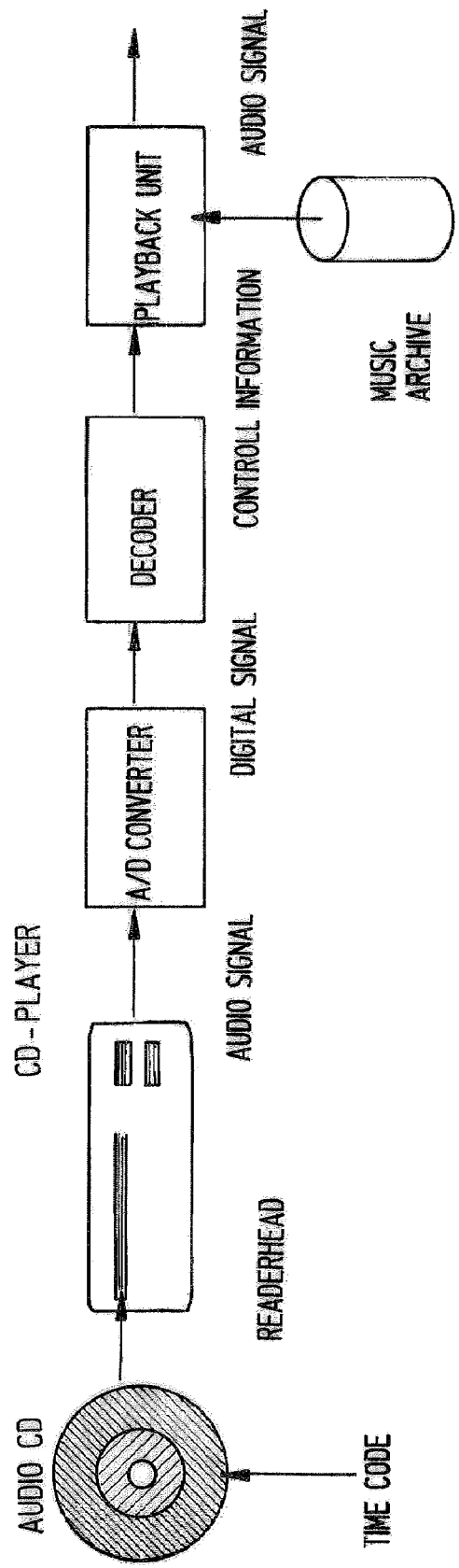
FIG. 4 the schematic structure of an embodiment according to the present invention based on a conventional CD player as control playback device.

By way of example, FIG. 4 shows a system, as described in claim 1, based on a conventional CD player. The individual components speak for themselves. The playback unit represents the playback control.

What is claimed is:

1. A system for playing back digitally stored playback information,
   with a first playback device for controlling the playback of the digitally stored playback information, the first playback device having a reader head,
   with a control disk which can be played back on the first playback device, and which is equipped with control information, where the control information are coded such that a segment on the control disk over which the reader head is situated can be determined on the basis of the control information read by the reader head, with a second playback device, which is connected with the first playback device, and which comprises a decoder for the control information to determine the segments, and which has access to the digitally stored playback information, wherein the segments are individually assigned to functions of the second playback device and the second playback device is controlled by means of the decoded segments.

2. The system according to claim 1, wherein the second playback device is a PC and the control disk is a record, a CD or a DVD.

3. The system according to claim 1, wherein said control information controls one or more functions selected from the group consisting of: a playback speed module, a music archive selection unit, a programming unit for managing skip marks, a loading module for software modules, a managing unit for determining the length of audio loops, and a parameter control module for modifying parameters related to the playback of said digitally stored information.

4. The system according to claim 3, wherein said parameters are effect parameters selected from the group consisting of: volume, filter, flange, echo, delay, control of video sequences, colour, resolution, and positioning of objects in computer games.

5. The system according to claim 1, wherein the second playback device allocates functions to segments.

6. The system according to claim 1, wherein said digital stored information is at least one of music, video or computer game data.

7. A system for playing back digitally stored playback information, comprising
a first playback device for controlling the playback of the digitally stored playback information, the first playback device comprising reading means for reading digital playback media,
a digital playback medium playable on the first playback device and comprising control information indicating the position which is read by the reading means,
a second playback device being connected with the playback device and comprising
means for evaluating the control information read by the reading means and received from the first playback device to detect at least one of speed and turning direction of the digital playback medium played on the first playback device, and
means for playing back the digitally stored playback information depending on the detected speed or direction.

8. A system according to claim 7, where the first playback device is a compact disk player or a DVD player.

9. A system according to claim 7, where the digital playback medium is a CD or DVD.

10. A system according to claim 7, where the second playback device is a PC.

11. A system according to claim 7, where digitally stored playback information comprises at least one of music, video or computer game data.

12. A playback device for playing back digitally stored information, comprising:
means for accessing the digitally stored information,
an interface for connection to a controlling audio or video data playback device, on which a control disk provided with information patterns is playable,
with a storage area in which data patterns are stored that are individually associated with functions of the playback device for playing back digitally stored information,
with means for decoding the information patterns of the control disk provided over the interface and comparing the patterns with information in the storage area, to select and execute the function on the digitally stored information when a corresponding pattern is identified.

13. The playback device according to claim 12, wherein said stored patterns are operative to control one or more functions selected from the group consisting of: a playback speed module, a music archive selection unit, a programming unit for managing skip marks, a loading module for software modules, a managing unit for determining the length of audio loops, and a parameter control module for a continuous modification in parameters affecting playback.

14. The playback device of claim 13, wherein said parameters affecting playback are selected from the group consisting of: volume, filter, flange, echo, delay or a playback control of video sequences, colour, resolution, and positioning objects in computer games.

15. The playback device according to claim 12, wherein the playback device comprises a PC with an interface for establishing the connection to said controlling audio or video data playback device.

16. The playback device according to claim 12, wherein said digitally stored information is music, video or computer game data.

17. A method for controlling a playback device for playing back digitally stored information, wherein the playback device comprises interface means which enable a connection to an audio or video data playback control device, wherein
in an initializing step storing information patterns in a storage area accessible by the playback device, which are associated with functions of the playback device,
in a further monitoring step, information delivered by said audio or video data playback control device is continuously read by the playback device in order to compare it with the patterns, where the allocated function of the playback device is being performed when a pattern is identified, wherein performing the function comprises controlling the playback of at least a part of the digitally stored information by the playback device.

18. The method according to claim 17, wherein the functions are individually allocated to the patterns.

19. The method according to claim 17, wherein the functions enable access to digitally stored information.

20. The method according to claim 17, comprising controlling a function selected from the group consisting of: a playback speed module, a music archive selection unit, a programming unit for managing skip marks, a loading module for software modules, a managing unit for determining the length of audio loops, and a parameter control module for a continuous modification of parameters affecting playback.

21. The method according to claim 20, wherein said parameters affecting playback are selected from the group consisting of: volume, filter, flange, echo, delay, playback control of video sequences, colour, resolution, and positioning objects in computer games.

22. A computer-readable medium having stored thereon instructions to cause a computer to execute the method defined in claim 17 when loaded into a computer.

23. A method for controlling playback of digitally stored playback information using a digital playback medium equipped with time or counting information, the method comprising the steps of:
connecting a playback device to be controlled via interface means with a digital controlling playback device,
providing access from the playback device to be controlled to the digitally stored playback information, playing the digital playback medium on the digital controlling playback device, reading the time or counting information by the digital controlling playback device evaluating the read information by evaluating means in order to detect information of at least one of speed and direction of the digital playback medium, and controlling at least one of speed and direction of the digitally stored playback information based on the detected information.

24. The method according to claim 23, wherein the digital controlling playback device is a compact disk player or a DVD player.

25. The method according to claim 23, wherein said digital playback medium is a CD or DVD.

26. The method according to claim 23, wherein said digitally stored information comprises at least music, video or computer game data.

27. A computer-readable medium having stored thereon instructions to cause a computer to execute the method defined in claim 23 when loaded into a computer.

28. A playback system for digitally stored playback information, the system comprising a first playback device with means for reading the code of a digital playback medium, the code indicating the position which is read by reading means of the first playback device, and a second playback device for playing back the digitally stored playback information, being connected with the first playback device and comprising means for receiving signals generated based of the code of the played digital playback medium, means for evaluating the signals received from the first playback device to detect at least one of speed and turning direction of the digital playback medium played on the first playback device, and means for playing back the digitally stored playback information based on the detected speed or direction.

29. A playback system for digitally stored playback information, the system comprising a conventional record player equipped with a pick-up element, and a playback device for playing back the digitally stored playback information, being connected with the conventional record player and comprising means for evaluating control information read by the pick-up element from a played record and received from the conventional record player to detect pattern of the control information, which is assigned to functions of the playback device, and means for controlling the playback device based on the detected functions, the record having optical marks indicating the function encoded in the marked location.

30. A record readable by a conventional record player equipped with a pick-up element, the record having a code thereon and optical marks indicating at least one function encoded in the marked location, the code causing a playback system comprising the conventional record player and a playback control device to execute a method, the method comprising:

playing the record on the conventional record player;

receiving signals by the digital playback control device communicatively connected to the conventional record player, the signals being generated by the code of the played record;

evaluating the received signals for detecting a pattern of the signal, which is assigned to functions of the playback control device, and controlling by the playback control device the playback of digitally stored playback information based on the detected pattern.

31. A digital playback medium readable by a playback device, the readable digital playback medium having a code thereon for causing a playback system comprising the playback device and a playback control device to execute a method, the method comprising:

playing the digital playback medium on the playback device;

receiving signals by the digital playback control device communicatively connected to the playback device, the signals being generated by the code of the played digital playback medium;

evaluating the received signals for detecting the position which is read by reading means of the playback device, and controlling by the playback control device the playback of digitally stored playback information based on the detected position.

* * * * *